United States Patent Office 2,897,170
Patented July 28, 1959

2,897,170

ANTISTATIC TREATMENT WITH A QUATERNARY AMMONIUM COMPOUND CONTAINING A POLYETHENEOXY GROUPING AND PRODUCTS THEREOF

Arnold H. Gruber, Stamford, Conn., assignor to American Cyanamid Company, New York, N.Y., a corporation of Maine No Drawing. Application April 9, 1954
Serial No. 422,265

16 Claims. (Cl. 260—32.6)

This invention relates broadly to the antistatic treatment of materials and to the products thereof. More particularly the invention relates to the method of conditioning a material or article which, in a dry state, normally tends to accumulate static charges of electricity thereon, whereby this tendency is minimized or obviated, and to the treated materials or articles, for instance, textile materials in fiber, fabric or other form, sheet materials, e.g., those used in making photographic films, etc. The scope of the invention includes molding compositions and molded articles comprising (1) a plastic material (e.g., a vinyl resin) which normally tends to accumulate static charges of electricity after the article has been molded (or during molding) and (2) an antistatic agent therefor comprising a particular nitrogenous compound or compounds.

The nitrogenous compounds that are used in the compositions and articles of this invention can be represented by the general formula (I) 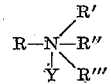

or

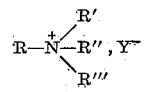

wherein R represents a member of the group consisting of aliphatic hydrocarbon and alicyclic hydrocarbon radicals containing at least 7 carbon atoms, R' designates a radical represented by the formula $-(C_nH_{2n}O)_mH$ where $n$ represents a positive integer from 2 to 4, inclusive, and $m$ is a positive integer and is at least 3, R" represents a member of the group consisting of alkyl and hydroxyalkyl radicals containing from 1 to 5 carbon atoms, inclusive, and radicals having the same meaning as R', R''' represents a member of the group consisting of hydrogen and radicals having the same meaning as R", and Y represents an anion.

Illustrative examples of radicals represented by R in Formula I are heptyl, octyl, octenyl, nonyl, nonenyl, decyl, decenyl, undecyl, undecenyl, tridecyl, tetradecyl, tetradecenyl, heptadecyl, heptadecenyl, octadecyl, octadecenyl, the residue of abietic acid, etc. Illustrative examples of radicals represented by R' are trietheneoxy, tetrapropeneoxy, pentaisopropeneoxy, hexabuteneoxy, heptaisobuteneoxy, octaetheneoxy, decabuteneoxy, octadecaetheneoxy, eicosaisopropeneoxy, triacontaetheneoxy, octatriacontaetheneoxy, etc. Illustrative examples of radicals represented by R" and R''' are methyl, ethyl, propyl, isopropyl, n-butyl, isobutyl, sec.-butyl, tert.-butyl, n-amyl, isoamyl, sec.-amyl, tert.-amyl and the other isomeric amyl radicals, hydroxyethyl, hydroxypropyl, hydroxyisopropyl, dihydroxypropyl, hydroxybutyl, dihydroxybutyl, hydroxyamyl, dihydroxyamyl, etc. Illustrative examples of anions represented by Y are the halide ions (that is, Y can represent a chloride, bromide, fluoride or iodide), sulfate, sulfonate, phosphate, phosphite, hydroxide, borate, carbonate, hydrocarbonate, thiocyanate, isocyanate, sulfite, bisulfite, nitrate, nitrite, oxalate, silicate, sulfide, cyanate, acetate, ethylsulfate, and the other common inorganic and organic ions.

The nitrogenous compounds embraced by Formula I are sometimes generically termed herein as "quaternary ammonium compounds," which term, when R''' represents hydrogen, includes compounds that are usually designated as tertiary amine salts.

One embodiment of the present invention is concerned with a method which comprises applying to a base material or article of the kind mentioned hereinbefore a liquid-treating composition (specifically an aqueous, alcoholic or aqueous-alcoholic solution or dispersion) comprising a nitrogenous compound of the kind covered by Formula I. The amount of the aforesaid liquid-treating or antistatic composition that is applied to the base material or article in such that the finished material has associated therewith from, by weight, 0.2% to 15% of the aforesaid nitrogenous compound, based on the weight of the dry, untreated material. The nitrogenous compound is dissolved or dispersed ("dispersed" being used generically herein to cover both solutions and dispersions) in a volatile liquid, e.g., water, alcohol (for instance isopropanol) or a mixture of water and alcohol. The treated material or article is then dried to volatilize the aforesaid liquid.

As has been indicated hereinbefore another embodiment of the present invention is directed to the production of molding compositions and molded articles. Such compositions and articles are produced by incorporating the antistatic agent comprising a nitrogenous compound of the kind embraced by Formula I into a molding composition containing a plastic material which normally tends to accumulate static charges of electricity after the article has been molded, and then molding the resulting molding composition. In such applications the amount of the said nitrogenous compound which is incorporated into the molding composition generally constitutes, by weight, from 1% to 15% of the weight of the said plastic material.

It was known before this invention to use quaternary ammonium compounds of a kind different from those which are used in practicing the present invention as antistatic agents for materials that normally tend to accumulate static charges of electricity, and specifically a thermoplastic vinyl resin. In this connection see, for example, Carnes Patents 2,626,876 and 2,626,877, dated January 27, 1953.

The present invention is based on the discovery that nitrogenous compounds of the kind embraced by Formula I possess an unobvious combination of properties which renders them eminently suitable for the treatment of a wide variety of textile materials, e.g., in the form of continuous-filament yarn, staple fiber, tow, roving, knitted, woven or felted fabrics, and which may be composed of or contain fibers or filaments of wool, silk, cellulose esters (e.g., cellulose acetate, cellulose acetobutyrate, cellulose formate, cellulose propionate, cellulose butyrate, etc.), cellulose ethers (e.g., ethyl cellulose, benzyl cellulose, etc.), viscose rayons, nylon, thermoplastic vinyl resins (e.g., vinyl chloride polymers and copolymers, acrylonitrile polymers and copolymers, etc.), and other natural and synthetic textiles in fiber, fabric or other form. The preferred compositions employed in practicing this invention have both a softening and lubricating action on the textile and, in addition, have the ability to retard or obviate the accumulation of static charges of electricity on such textiles which normally tend to become charged with static electricity. Furthermore, the preferred antistatic compositions are relatively durable in their antistatic effect, especially on certain articles (e.g., polyacrylonitrile fibers); that is, they impart antistatic properties to the material which has been treated with the composition through a series of launderings, more particularly through more than 5 launderings under the conditions described later herein. In addition, the preferred antistatic agents employed in practicing the present invention are substantive under the preferred conditions of application (namely, at or near the boil) to certain particular materials, e.g., polyacrylonitrile fibers; that is, they exhaust the bath used in applying them to the material and become fixed thereon in the same manner that certain dyes are substantive to a material being dyed and become fixed on the material without the use of a mordant.

In many types of molded articles the plastic material contained therein is one which normally tends to accumulate static charges of electricity. This is particularly objectionable to the retailer since it necessitates frequent wiping of the article to remove the dust, and this in turn results in a further accumulation of a static charge. The matter of accumulated static electricity on the article also is very objectionable to the housewife in the case of decorative and other household articles since the accumulated static electricity attracts dust particles and necessitates more frequent "dusting" (wiping to remove dust) and cleaning of the articles. With other molded articles such, for example, as sound-reproducing records and specifically phonograph records, the dust particles attracted by the accumulated static electricity constitute a more serious practical objection since they cause surface noise and abrasion of the record and hence are one cause of poor tonal or reproduction qualities and short life of the record. Attempts to solve this problem by surface treatment of the molded article with an antistatic agent have not been commercially successful since the treatment is expensive and involves an extra step or steps; also, it imparts, at best, only temporary antistatic charactereistics to the treated article. Furthermore, in the case of phonograph records, such a surface treatment often detracts from the tonal and reproduction qualities of the record.

For optimum results, the antistatic agent should be compatible with, or substantially uniformly dispersible throughout, the plastic material. Also it should not "bleed" from the molded article; should not detract from the moldability of the molding composition; and should not impart objectionable characteristics to the molded article, e.g., decrease the resistance to wear and handling, or, in the case of sound records, lessen the tonal reproduction characteristics or the faithfulness of reproduction, or shorten the normal life of the sound tracks.

The present invention is based on the further discovery that an antistatic agent comprising a nitrogenous compound of the kind embraced by Formula I, or mixtures thereof in any proportions, can be substantially homogeneously dispersed or distributed throughout a molding composition containing a plastic material which normally tends to accumulate static charges of electricity, with or without fillers or other additives commonly incorporated into molding compositions, and that the resulting composition can be molded into articles of manufacture, specifically sound records, having antistatic characteristics throughout the normal useful life of the article and without detracting in any way from its other useful properties. In many cases the antistatic characteristics are substantially permanent, as evidenced by the fact that the article retains its antistatic properties even after repeated washings with soap and water. This was quite surprising and unexpected and in no way could have been predicted. One reason for this inability to predict the results obtained is because it could not have been predicted that the nitrogenous compounds of the kind embraced by Formula I would retain their antistatic properties after being subjected to the heat incurred during molding of the plastic containing the antistatic agent.

PREPARATION OF NITROGENOUS COMPOUND

The nitrogenous compounds used as antistatic agents in practicing the present invention can be prepared by various methods, for instance as is fully described in the copending application of Walter H. Schuller and Joseph J. Carnes, Serial No. 422,243, filed concurrently herewith, and now abandoned. Thus, some of the compounds advantageously can be prepared by a reaction illustrated by the following equations and wherein ethylene oxide is shown as the alkylene oxide employed:

(II)

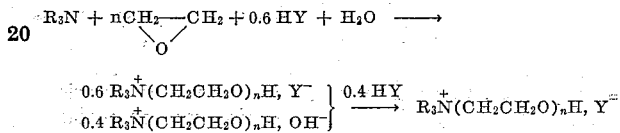

The reaction is carried out in a reaction vessel fitted with a mechanical stirrer, a Dry-Ice reflux condenser, a thermometer and a source of heat such as a steam bath. The tertiary amine is dissolved in a secondary or tertiary alcohol, and to the resulting solution is added from 40 to 80% of the theoretical quantity of acid, e.g., sulfuric, hydrochloric, nitric, phosphoric, acetic, chloroacetic, succinic, phthalic, etc., required for complete neutralization of the amine. In calculating the amount of acid required, dibasic and tribasic acids, such as sulfuric and phosphoric acids, are considered for this purpose to be monobasic. The resulting solution (pH of about 8) is heated to reflux (80–100° C.), and ethylene oxide is added at such a rate that moderate reflux takes place. After the desired amount of ethylene oxide has been added over a period of from 2 to 10 hours, the reaction mixture is refluxed for an additional hour to insure that the reaction has gone to completion. A potentiometric titration is carried out at this point to make certain that the quaternarization is complete. The alkaline solution is then adjusted to a suitable pH, e.g., a pH of about 4 or 5, with the appropriate acid.

Another method by which some of the compounds advantageously can be prepared is by a reaction illustrated by the following equation and wherein ethylene oxide again is shown as the alkylene oxide employed:

(III)

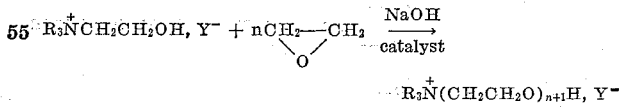

The quaternary ammonium salt is dissolved in water or a water-tertiary alcohol mixture and the solution adjusted to pH 8 by the addition of 40% aqueous sodium hydroxide. An additional 15 mole percent of sodium hydroxide (based on the quaternary ammonium salt) is added, again as a 40% aqueous solution. The mixture is heated to reflux and ethylene oxide introduced below the surface of the liquid at such a rate that a moderate amount of reflux, at a reflux temperature between 80–100° C., is obtained. The reaction is carried out in a reaction vessel fitted with a mechanical stirrer, a Dry-Ice reflux condenser, a thermometer and a source of heat such as a steam bath. After the desired quantity of ethylene oxide has been added over a period of from two to ten hours, the reaction mixture is refluxed for an additional one to two hours (temperature at 95–105°

C.) to insure the completeness of the reaction. The resulting solution is adjusted to a suitable pH, e.g., a pH of about 4 or 5, by the addition of the appropriate acid.

The free quaternary ammonium base can be prepared from any of the hereindescribed quaternary ammonium salts of inorganic acids by treating a water-free solution of the salt, for instance the chloride, in n-butanol (or isopropanol or tert.-butanol) with a slight excess of the sodium salt of the alcohol used. After cooling and standing for about 16 hours, the crystalline sodium salt of the inorganic acid is filtered from the solution of quaternary ammonium alkoxide. Water is added to the mixture to yield the quaternary ammonium hydroxide. The reaction is illustrated by the following equations:

(IV)

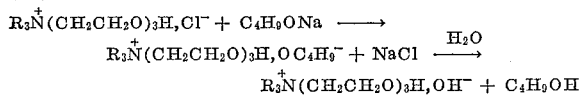

$$R_3\overset{+}{N}(CH_2CH_2O)_3H, Cl^- + C_4H_9ONa \longrightarrow$$
$$R_3\overset{+}{N}(CH_2CH_2O)_3H, OC_4H_9^- + NaCl \xrightarrow{H_2O}$$
$$R_3\overset{+}{N}(CH_2CH_2O)_3H, OH^- + C_4H_9OH$$

More detailed procedures for preparing certain specific compounds are given in some of the examples given later herein.

PRODUCTION OF MOLDING COMPOSITIONS

This invention is applicable to the production of molding compositions comprising any plastic (i.e., moldable plastic) material which normally tends to accumulate static charges of electricity after the article has been molded and among which are included, in addition to vinyl resins, such plastic (both thermoplastic and thermosetting) materials as the following: nylon, polyethylene, ethyl cellulose, cellulose actate, cellulose butyrate, cellulose nitrate, polyester resins, phenolic resins, modified and unmodified alkyd resins, urea-formaldehyde resins, melamine-formaldehyde resins, etc.

The present invention is particularly applicable to the production of molding compositions and molded articles, especially phonograph records, containing a vinyl resin, more particularly a thermoplastic vinyl resin, e.g., polystyrene; polyvinyl chloride; copolymers of vinyl chloride and vinylidene chloride, especially those containing from about 5% to about 15% by weight of vinylidene chloride combined in the copolymer molecule; and copolymers of vinyl chloride and vinyl acetate, especially those containing from about 6% to about 15% by weight of vinyl acetate combined in the copolymer molecule. Other examples include resins produced by the conjoint polymerization of a vinyl halide, e.g., vinyl chloride, with a nitrile of unsaturated acid, e.g., acrylonitrile, methacrylonitrile, etc.; resins produced by the halogenation (e.g., chlorination) of polyvinyl chloride and other polyvinyl halides; resins produced by the chlorination of copolymers of a vinyl halide with a vinyl ester of an aliphatic acid; resins produced by the conjoint polymerization of vinyl chloride or other vinyl halide with an N-alkylated imide derivative of an aliphatic acid, e.g., N-butyl maleimide; and resins produced by the conjoint polymerization of a vinyl halide, a vinyl ester of an aliphatic acid and maleic acid. Copolymers of a vinyl halide and a vinyl ester of an aliphatic acid other than the vinyl chloride-vinyl acetate copolymers described above can be used in the molding compositions and molded articles of this invention. Such resinous copolymers are more fully described in, for example, Rugeley et al. U.S. Patent No. 2,161,766, and generally contain about 50% to about 95% by weight of combined vinyl halide in the copolymer, the remainder being a vinyl ester of an aliphatic acid.

In practicing the embodiment of this invention directed to the production of molding compositions, a suitable amount of an antistatic agent comprising a nitrogenous compound of the kind embraced by Formula I is incorporated by suitable means into the plastic material to form a substantially homogeneous composition. Fillers and/or other additives normally employed in the preparation of the composition may also be incorporated therein, as desired or as conditions may require. The amount of antistatic agent which is employed may be considerably varied, but in molding applications is generally within the range of from about 1% to about 15%, more particularly from about 2% to about 10%, by weight of the vinyl resin or other plastic material used.

Taking the production of a vinyl-resin type phonograph record as illustrative of the molded article to be made, the following is a typical general procedure. The vinyl resin and antistatic agent, together with the usual fillers and other additives (e.g., carbon black, stabilizer, mineral filler, etc.) are blended together in conventional apparatus, e.g., a ribbon blender, until a substantially uniform mixture has been obtained. Since the antistatic agent is normally prepared and made available in the form of an aqueous or aqueous-alcoholic solution or dispersion, non-uniform distribution may occur in this blending step unless care be taken to avoid the same. A non-uniform blend at this stage would lead to trouble in the fusion step. This possible source of trouble can readily and conveniently be avoided by first depositing the antistatic agent on the surfaces of one of the other ingredients that is to be incorporated into the molding composition. The amount of antistatic agent which is deposited on the surfaces of the finely divided or comminuted filler or additive, when this practice is followed, may be varied as desired or as conditions may require. Ordinarily, however, the amount of antistatic agent which is deposited on the surfaces of the filler material will constitute from about 0.05% to about 300% or more by weight of the filler. Depending, for example, upon the particular kind of filler which is treated and the mode of treatment, the antistatic agent may be deposited mainly or almost solely on the external surfaces of the filler, or, in the case of porous fillers, on both internal and external surfaces of particles of the filler. The amount of antistatic agent on the filler should not be so great as to cause the treated filler to be so cohesive that it loses its normally free-flowing characteristics. Conveniently the antistatic agent is applied to the filler in such concentration that use of the treated filler in its desired percentage in the ultimate composition will result in a final composition containing the desired amount of antistatic agent.

The deposition of the antistatic agent upon the surfaces of one of the other additives to the molding composition may be effected by any suitable means. One suitable method comprises flooding one of the powdery additives, e.g., carbon black, mineral filler (e.g., finely divided calcium carbonate), vinyl resin, etc., with the amount of antistatic agent to be incorporated in the molding composition and which has been diluted with water or other volatile liquid medium to give a uniform slurry, after which the mixture is dried to its original powdery form.

Fusion of the blended mixture is normally done in a heated internal mixer, e.g., a Banbury mixer. After the fusion of the plastic material with the additives, the charge is dumped and sheeted out on a mill. From the resulting slab or sheet, pieces are then cut of a size so that each blank or biscuit will make a record.

To mold the record, the biscuit is preferably preheated and then placed between the stampers in the press which is warm. After closing, the press is cooled; and at a suitable stage in the cooling cycle the press is opened and the record removed.

ANTISTATIC TREATMENT OF SHAPED ARTICLES

In using the antistatic compositions herein involved in the treatment of shaped or fabricated articles which, in a dry state, normally have a tendency to accumulate static charges of electricity, a solution or a dispersion of the composition is applied by any suitable means to the article, followed by drying of the treated article to volatilize the solvent or liquid component. The treatment is applicable to such articles in various forms, for instance in the form of filaments, fibers, yarns, films, woven, knitted and felted fabrics, etc. These antistatic compositions are particularly useful as antistatic finishes for fibers or fabrics composed of or comprising substantial proportions of silk, nylon, wool, viscose rayons, cellulose acetate or other cellulose ester rayons, vinyl resins, including homopolymeric and copolymeric acrylonitrile and other thermoplastic vinyl resins.

As is well known to those skilled in the art, the vinyl resins constitute a class of materials which develop or tend to develop an electrostatic charge upon their surfaces when fibers or other articles made therefrom are subjected to friction during their production and during processing or fabrication of the fibers into fabric or other articles, as well as during the use of the finished article. The antistatic compositions involved herein have been found to be particularly adapted for use in conditioning filaments, fibers, yarns, films and other shaped articles composed of or containing a vinyl resin so as to obviate or minimize their tendency to accumulate static charges of electricity. Numerous examples of such vinyl resins have been given hereinbefore. One preferred class of vinyl resins that are subjected to treatment with the antistatic compositions herein involved are acrylonitrile polymerization products, especially those which contain a substantial amount, more particularly a preponderant proportion, by weight of combined acrylonitrile.

Antistatic compositions used in practicing the present invention may be applied under various pH conditions, as desired or as conditions may require. They may be used alone or with other additives or modifiers, e.g., mono-, di- and triethanolamines, lanolin, morpholine, di-sodium phosphates, dialkyl phosphates, alkyl esters of long-chain fatty acids, e.g., the ethyl to amyl, inclusive, esters of fatty acids containing from 12 to 18 carbon atoms, inclusive, conventional wetting and/or dispersing agents, silicone oils, mineral, vegetable and animal oils, etc. The liquid compositions can be applied advantageously in many cases at a pH of about 6.0 to 7.0, e.g., to articles formed of a polymer of acrylonitrile or other vinyl resin, or to other materials requiring an antistatic treatment.

The antistatic compositions with the use of which this invention is concerned not only are capable of imparting antistatic characterstics to vinyl resins (including thermoplastic vinyl resins) and other articles which normally, when dry, have a tendency to accumulate electrostatic charges, but in general they are also able to effect this result without detrimentally affecting the color, tensile strength, elasticity, chemical resistance, bacterial and fungal resistance, and other valuable properties of the vinyl resin; in other words, without rendering the vinyl resin article (or other material that is treated) in any way unsuited for its intended purpose. As a matter of fact, and as has been mentioned hereinbefore the preferred antistatic compositions also beneficially affect the article by imparting softness and lubricity thereto.

The antistatic compositions herein involved are preferably applied to the article to be treated in the form of a liquid dispersion. This dispersion may contain any suitable amount of the antistatic composition, but ordinarily it constitutes from about 0.1% to about 20% by weight thereof. The dispersion may be applied, for example, by immersing the fiber (or other shaped article formed of vinyl resin or other material) in the dispersion, or by spraying, padding, brushing or otherwise contacting the article with the dispersion. The dispersion may be applied at temperatures ranging, for instance, from room temperature (20°–30° C.) up to the boiling temperature of the dispersion, e.g., about 100° C., as desired or as conditions may require. Optimum results generally are obtained when the antistatic agent is applied at the boiling temperature of the dispersion (or at a higher temperature under pressure) and an immersion time of, for example, from 10 minutes to 1 hour. Upon drying the fiber or other shaped article at room temperature or at an elevated temperature, e.g., on heated drying rolls, in ovens, tunnel driers, etc., the treated article has the solid antistatic composition deposited at least on the outer surfaces thereof. The amount of antistatic composition which is present in or on the dried, treated material or article may vary considerably, but ordinarily it is present therein or thereon in an amount, by weight, corresponding to from about 0.2% to about 15% of the dried, untreated article.

The antistatic compositions employed in practicing this invention may be applied to, for instance, a shaped thermoplastic vinyl resin, for example, yarns of associated filaments of such a resin, in the course of the production of the yarn or other shaped article, or subsequent to the production of the yarn and before or after any textile operations in which such yarns are used, especially those operations which include or involve a winding operation. By applying the antistatic composition in the course of producing the filaments or fibers, the application may suffice for subsequent textile operations. If desired, however, the textile-treating agent comprising the antistatic composition may be applied both during the process of producing the yarns as well as later when these yarns are fabricated into textile fabrics.

The antistatic composition also may be applied to, for instance, thermoplastic vinyl resins or other articles when the latter are in gelled form. For example, a liquid-treating agent containing the antistatic composition may be applied to a fiber in gel state, more particularly an aquagel state, and in which the solid phase comprises, for example, an acrylonitrile polymerization product, more particularly such a product which contains in the molecules thereof an average of at least about 80% by weight of combined acrylonitrile. Thereafter the thusly treated, gelled fiber is dried, for example by continuously passing the fiber over heated drying rolls as is described more fully in, for instance, Cresswell et al. Patent No. 2,558,-733, dated July 3, 1951. In this way the applied composition imparts antistatic characteristics to the fiber both during and after drying thereof.

The antistatic compositions herein involved are especially suitable for use in the treatment of oriented or unoriented fibers, films, etc., in gel state and which have been produced as described in, for example, Cresswell Patents 2,558,730 and 2,558,731, dated July 3, 1951, and in the aforementioned Cresswell et al. Patent No. 2,558,-733; also, in the treatment of the dried products, whereby the tendency of the dried material to accumulate static charges of electricity is obviated or minimized and a treated material which, in general, is softer to the touch is obtained.

As has been mentioned hereinbefore, any suitable method may be employed in applying the antistatic composition to the vinyl resin or other base material in fiber, film or other form, and it may be applied at any suitable stage of the production of the shaped article, or during its fabrication into other forms, or to the finished, fabricated article and prior to or during its service use. For example, if the conditioning agent comprising the antistatic composition is to be applied to the yarn after spinning, the yarn may be brought into contact with a wick, roll or felt which has been wetted with a solution or dispersion containing the antistatic agent dissolved or dispersed in water, ethanol (or other alcohol), a water-alcohol mixture, or other liquid solvent or dispersion media. Alternatively, the antistatic composition in liquid state may be applied by immersing the article in a bath containing the same. Examples of points during the production of a yarn at which the antistatic composition may be applied are during stretching of a wet-spun yarn or fiber to orient the molecules thereof, or between any of the guides or godets or other rolls employed in the spinning process, or between the guide and the point of winding and/or twisting; or, the antistatic composition may be applied after winding onto cones, spools, bobbins or the like; or, in the case of staple fiber manufacture either prior to or after cutting the tow into staple lengths.

For example, a tow of filaments that is to be cut into staple fibers may be treated with a dispersion of the antistatic composition prior to cutting. Alternatively, staple fibers such as those which may occur naturally or those cut from continuous lengths of natural or artificial filaments, may be treated with a dispersion of the antistatic composition, e.g., by spraying while the fibers are being moved on a continuous conveyor beneath the spray, followed by drying the treated fibers. Or, the treatment may be applied during an intermediate stage of the spinning operations, e.g., immediately after lapping, carding, drawing or slubbing; or, the antistatic composition may be applied during fiber-mixing or -blending operations.

If desired, the antistatic composition which is deposited in or on the treated article may be allowed to remain in place during and after the production of the article in its ultimate form. The treated fibers or fabrics can be dyed, if desired, without scouring off the antistatic finish prior to dyeing.

The use of nitrogenous compounds of the kind embraced by Formula I in the treatment of, for example, wool, nylon, silk, viscose and acetate rayons, vinyl resins, etc., to obviate or lessen the tendency of such materials to accumulate charges of electricity thereon has numerous advantages, among which may be mentioned their ease of application (e.g., as aqueous dispersions, at any pH, in the cold, or warm, or at the boil); the fact that they are chemically stable to aging; the fact that they do not form insoluble compounds or bodies in dispersions thereof in hard water; their effectiveness both as antistatic agents and in lubricating and softening the shaped article in yarn or other form, whereby the treated yarn, film or other article is rendered more amenable to further processing or fabricating (e.g., weaving, knitting, etc., in the case of yarns); the fact that they do not physically damage or have any other deleterious effect upon the fiber, fabric or other article to which it has been applied or in which it is incorporated; their compatibility with other conditioning agents commonly employed in finishing compositions used in treating fibers and other shaped articles; their ease of removal from the treated article, when such removal appears to be desirable for subsequent processing or use of the article; their non-harmful effect upon the vinyl resin or other material which is subjected to treatment; and the substantivity and antistatic durability that is obtained with the preferred antistatic agents on certain articles, e.g., polyacrylonitrile fibers.

The term "yarn" as used generically herein includes within its meaning a single filament, a plurality of filaments associated into the form of a thread and which may be of any desired twist, single or multiple threads associated or twisted together, as well as staple fibers produced from filaments or threads and spun yarn produced from such staple fibers. The term "fiber" as used generically herein includes both monofilaments and multifilaments.

In order that those skilled in the art may better understand how the present invention can be carried into effect, the following examples are given by way of illustration and not by way of limitation. All parts and percentages are by weight.

The first eight examples are illustrative of the use of the antistatic agents with which this invention is concerned in the production of molding compositions and molded articles.

Example 1

In this example blending is done by hand-stirring the contents of a vessel with a flat-blade stirrer. The fusing cycle is carried out on a two-roll mill, with both rolls at 130° C. The molding operation consists in forming a piece 3" x 3" x 0.1" in a test-sheet mold. The blanks are formed between sheets of aluminum foil to facilitate removal from the mold. Antistatic properties are determined by rubbing the surface of the blank 40 times with a woolen cloth and immediately thereafter passing the rubbed blank about ¼" above a bed of finely divided cigarette ashes. A sample having no antistatic characteristics will be completely covered with ash. A sample exhibiting excellent antistatic properties will show no pick-up of ashes.

|  | A Parts | B Parts | C Parts |
|---|---|---|---|
| Vinylite VYHH resin [1] | 90.8 | 90.8 | 90.8 |
| Carbon black | 5.0 | 5.0 | |
| Dibasic lead stearate (stabilizer) | 1.5 | 1.5 | 1.5 |
| Hexadecyl diethyl hexaetheneoxy ammonium chloride | 2.7 | | |
| Dodecyl dipropyl tetraetheneoxy ammonium bromide | | 3.0 | |
| Carbon black pretreated with tetradecyl di-(β-hydroxyethyl) octaetheneoxy ammonium phosphate in a weight ratio of 2 parts of carbon black to 1 part of the quaternary ammonium salt | | | 8.0 |

[1] A copolymer of vinyl chloride and vinyl acetate having 12-15% of vinyl acetate combined in the copolymer molecule.

Blanks molded from the above molding compositions show excellent antistatic characteristics.

Example 2

The procedure is the same as described under Example 1, and the molded articles have excellent antistatic characteristics.

|  | A Parts | B Parts |
|---|---|---|
| Vinylite VYHH resin | 90.8 | |
| Carbon black | 5.0 | 5.0 |
| Dibasic lead stearate | 1.5 | 1.5 |
| Octyl butyl di-(hexaetheneoxy) ammonium sulfate | 3.1 | |
| Vinylite VYHH resin pretreated with 3.4% by weight thereof of decyl tri-(decaetheneoxy) ammonium acetate | | 93.4 |

Example 3

An aqueous solution containing 10% of octadecyl di-(hexaetheneoxy) ammonium sulfonate is prepared. This solution is applied to granular polystyrene by soaking the polystyrene granules in the solution for several minutes. The treated granules are then dried. The dried granules contain about 2%, by weight of the polystyrene, of the antistatic agent. The treated granules are molded under heat and pressure into the form of a bar. The molded bar fails to accumulate a static charge of electricity when tested in essentially the same manner described under Example 1. After washing with soap and water, and testing again in the same manner, it still fails to accumulate a static charge of electricity when repeatedly rubbed with a woolen cloth.

Example 4

Same as in Example 3 with the exception that the nitrogenous compound is eicosyl dimethyl tetraetheneoxy ammonium phosphate, and the dried polystyrene granules contain about 1.5%, by weight of the polystyrene, of the antistatic agent. The molded polystyrene bar fails to accumulate static charges of electricity both before and after washing with soap and water and when tested in essentially the same manner described under Example 1.

Example 5

Another composition suitable for molding phonograph records is as follows:

| | Parts |
|---|---|
| Vinylite VYHH resin | 59.5 |
| Chlorinated paraffin wax [1] | 14.5 |
| Newport–V40 resin [2] | 5.0 |
| Dibasic lead stearate | 1.0 |
| Carbon black | 2.0 |
| Mineral filler, specifically calcium carbonate | 14.5 |
| Octadecyl methyl β-hydroxypropyl docosaethenoxy ammonuim phosphate | 3.0 |

[1] This chlorinated paraffin wax is sold by the Diamond Alkali Company under the trade name of Chlorowax No. 70. It is a 70% chlorinated paraffin hydrocarbon.

[2] This resin is sold by Newport Industries, Inc. It is of the type described and claimed in U.S. Patent No. 2,343,845. As described in this patent, the resin is made by reacting a terpene, e.g., turpentine, alpha-pinene or beta-pinene, in the presence of a boron trifluoride compound at about 30°–70° C.

A phonograph record having excellent antistatic characteristics is produced by molding this composition in accordance with the general practice followed in producing such articles.

The following examples illustrate the pretreatment of fillers with an antistatic agent of the kind embraced by Formula I. The treated filler is then incorporated into molding compositions such as described above by way of example.

Example 6

| | Parts | Approx. percent solids |
|---|---|---|
| Eicosyl dimethyl tetratriacontaetheneoxy ammonium chloride in the form of a 50% solution dissolved in a mixture of about 40% alcohol and 60% water | 6 | 75 |
| Finely divided calcium carbonate | 1 | 25 |

The above ingredients are thoroughly mixed until a substantially homogeneous composition is obtained, after which the mixture is dried in a steam oven. The product is passed through a U.S. Standard Sieve Series No. 20 screen. The resulting finely divided filler has a waxy feeling to the touch.

Example 7

| | Parts | Approx. percent solids |
|---|---|---|
| Doeicosyl di-isobutyl dodecapropeneoxy ammonium sulfamate in the form of an approximately 33.6% solution dissolved in a mixture of about 40% alcohol and 60% water | 6 | 67 |
| Carbon black | 1 | 33 |

The carbon black and the quaternary ammonium salt are placed in a ball mill and tumbled for about 16 hours. The uniform syrup that results is dried in a steam oven. The dried product is broken up and passed through a U.S. Standard Sieve Series No. 20 screen.

Example 8

| | Parts | Approx. percent solids |
|---|---|---|
| Hexadecyl diamyl octadecabuteneoxy ammonium phosphate in the form of an approximately 33.6% solution dissolved in a mixture of about 40% alcohol and 60% water | 1 | 25 |
| Finely divided calcium carbonate | 1 | 75 |

The calcium carbonate and the quaternary ammonium salt are thoroughly mixed to yield a substantially homogeneous composition and then passed through a U.S. Standard Sieve Series No. 70 screen. The screened product is spray-dried. The final product is a fine, free-flowing powder.

The following examples illustrate the application of nitrogenous compounds of the kind embraced by Formula I to various textile materials which, in a dry state, normally tend to accumulate static charges of electricity thereon.

Prior to application, 8″ x 8″ squares of the desized fabric or cloth to be treated are edged, washed 15 minutes in a 0.1% soap and 0.1% soda ash solution at 135° F., padded and dried 10 minutes in a drying oven at 200° F. The cloth samples are then placed in sealed weighing bottles and weighed. The normal application procedure comprises boiling the cloth samples in, for the most part, solutions of from about 0.1% to about 15 or 20% (solids basis) by weight of the individual antistatic agent being tested for a period of 30 minutes, using a 40:1 liquor to cloth ratio. After boiling, the impregnated samples are nipped in a padder to about 100% wet pickup, dried 10 minutes in a drying oven at 200° F., and re-weighed. From the difference in weight of the dried cloth before and after impregnation, the amount of antistatic agent retained by the cloth is determined.

Static properties of the impregnated cloths are determined immediately upon removal of the samples from the weighing bottles. The treated cloths are stroked firmly with a wooden dowel and suspended over particles of carbon black. The height in inches of the suspended cloth to which no more particles of carbon black are attracted is called the antistatic rating. If no movement of the carbon particles is observed when the cloth is held less than ⅛″ above them, the sample is given a static rating of zero and laundered. The durability of permanence of antistatic rating is defined as the number of launderings to which the treated cloth can be subjected before losing its zero static rating. The normal laundering procedure employed is similar to the preliminary laundering and comprises washing the cloths for 15 minutes in a 0.1% soap and 0.1% soda ash solution at 135° F. in a laboratory agitator washer, followed by thorough rinsing in water at 135° F. The rinsed samples are then nipped in a padder, dried 10 minutes at 200° F., and weighed to determine the amount of antistatic agent retained by the cloth.

Example 9

This example illustrates the use, as an antistatic agent on various cloths, of octadecyl dimethyl octatheneoxy ammonium chloride, which compound also may be named as the polyethoxamer (7) of 2-hydroxyethyl octadecyl dimethyl ammonium chloride. One method of preparing this compound is described below:

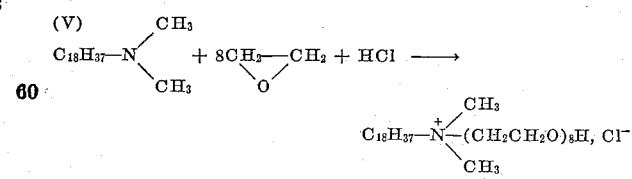

(V)

| | Grams | Moles |
|---|---|---|
| Octadecyl dimethyl amine | 59.4 | 0.20 |
| Ethylene oxide | 73.0 | 1.66 |
| Hydrochloric acid (75% of the theoretical quantity) | 15.0 g. of 12 N soln. | 0.15 |

The octadecyl dimethyl amine is dissolved in 60 g. of isopropanol, the hydrochloric acid added, and the mixture heated to approximately 84° C. To this solution having a pH of approximately 8 is then added the entire quantity of ethylene oxide over a 4-hour period and at a reaction temperature of about 82–85° C. A terminal 20-minute heating period at 91° C. is allowed. The resulting solution weighs 203 g., indicating that approximately eight equivalents of ethylene oxide has reacted. An aliquot of the reaction mixture is titrated. A curve with only one break in it is obtained, indicating that all of the tertiary amine present has been quaternarized. The solution is adjusted to pH 3 by the addition of sufficient 12 N hydrochloric acid to bring the total acid to more than 100% of the theoretical quantity required for the condensation.

Following the general procedure described above, the above compound is applied to fabrics comprised of the following fibers: Acrilan, Dacron, Dynel, Orlon and nylon (all of which are commercially available) and "A–MA" fiber, which is formed of a copolymer of about 90–95% acrylonitrile and about 10–5% methyl acrylate. The concentration of quaternary ammonium compound in the application bath is about 1%, and the liquid-to-cloth ratio is 40:1. In the case of the fabric comprised of the A–MA fiber, a durable antistatic rating is obtained through more than 5 launderings. A degree of substantivity is noted on the fabric formed of Orlon, but there is no substantial increase in antistatic durability. The treated fabrics comprised of Acrilan, Dacron, Dynel, Orlon and nylon fibers all show good antistatic properties initially, but tend to lose this characteristic upon laundering. The pertinent data are given in Table I.

TABLE I

| Cloth of— | Antistatic rating of untreated cloth in inches | Treated cloth | | | | | |
|---|---|---|---|---|---|---|---|
| | | Before laundering | | After 1 laundering | | After 5 launderings | |
| | | Percent finish on cloth | Antistatic rating in inches | Percent finish on cloth | Antistatic rating in inches | Percent finish on cloth | Antistatic rating in inches |
| A–MA | 2½ | 3.9 | 0 | 3.4 | 0 | 3.3 | 0 |
| Acrilan | 2½ | 0.9 | 0 | 0 | 1½ | | |
| Dacron | 2½ | 1.1 | 0 | 0 | 2 | | |
| Dynel | 2 | 1.0 | 0 | 0 | 1 | | |
| Orlon | 2 | 2.0 | 0 | 1.8 | ¾ | | |
| Nylon | 2½ | 0.9 | 0 | 0 | 2 | | |

*Example 10*

This example illustrates the use, as an antistatic agent on the same cloths treated in Example 9, of octadecyl dimethyl dotriacontaetheaneoxy ammonium dihydrogen phosphate, which compound also may be named as the polyethoxamer (31) of 2-hydroxyethyl octadecyl dimethyl ammonium dihydrogen phosphate. One method of preparing this compound is described below:

(VI)

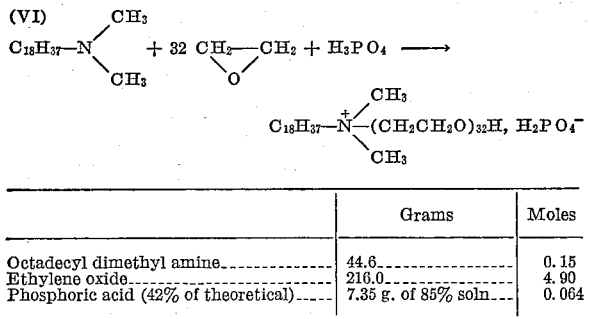

| | Grams | Moles |
|---|---|---|
| Octadecyl dimethyl amine | 44.6 | 0.15 |
| Ethylene oxide | 216.0 | 4.90 |
| Phosphoric acid (42% of theoretical) | 7.35 g. of 85% soln | 0.064 |

The octadecyl dimethyl amine is dissolved in 100 g. of isopropanol, the phosphoric acid added and the mixture is heated to approximately 82° C. To this hot solution having a pH of about 8 is added the entire amount of ethylene oxide over a 6-hour period with the temperature during this time varying from about 85° C. to about 90° C. A 15-minute terminal heating period at 94° C. is allowed. The weight of the resulting solution is 362 g., indicating that thirty-two equivalents of ethylene oxide has reacted. The solution is adjusted to pH 6 with the addition of sufficient 85% phosphoric acid to bring the total quantity of acid to slightly more than 100% of the theoretical quantity.

The same frabrics that were treated in Example 9 are treated with a solution of the above compound in the same manner described under Example 9.

In addition, a fabric formed of Orlon fibers is treated in a bath containing 3% (instead of 1% as in the other tests) of the above compound with no great improvement in the antistatic characteristics imparted to the treated fabric by the use of a bath containing a higher concentration of the quaternary ammonium compound. The pertinent data are given in Table II.

TABLE II

| Cloth of— | Antistatic rating of untreated cloth in inches | Treated cloth | | | | | |
|---|---|---|---|---|---|---|---|
| | | Before laundering | | After 1 laundering | | After 5 launderings | |
| | | Percent finish on cloth | Antistatic rating in inches | Percent finish on cloth | Antistatic rating in inches | Percent finish on cloth | Antistatic rating in inches |
| A–MA | 2½ | 4.1 | 0 | 3.3 | 0 | 3.3 | 0 |
| Acrilan | 2½ | 0.7 | 0 | 0 | 2 | | |
| Dacron | 2½ | 0.9 | 0 | 0 | 1¼ | | |
| Dynel | 2 | 0.9 | 0 | 0 | ¾ | | |
| Orlon | 2 | [1] 2.0 | 0 | 1.0 | 1½ | | |
| Do | 2 | [2] 5.5 | 0 | 1.9 | 1 | | |
| Nylon | 2½ | 0.9 | 0 | 0 | 2½ | | |

[1] Application bath contained 1% of the quaternary ammonium compound.
[2] Application bath contained 3% of the quaternary ammonium compound.

*Example 11*

This example illustrates the use, as an antistatic agent on a cloth formed of A–MA fiber (see Example 9 for a description), of hexadecyl dimethyl tetradecaetheneoxy ammonium dihydrogen phosphate, which compound also may be named as the polyethoxamer (13) of 2-hydroxyethyl hexadecyl dimethyl ammonium dihydrogen phosphate. One method of preparing this compound is described below:

(VII)

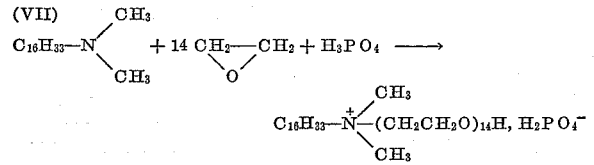

| | Grams | Moles |
|---|---|---|
| Cetyl dimethyl amine | 53.8 | 0.20 |
| Ethylene oxide | 135.0 | 3.07 |
| Phosphoric acid (60% of theoretical) | 14.0 g. of 85% soln | 0.12 |

The cetyl dimethyl amine is dissolved in 54 g. of isopropanol, the phosphoric acid added, and the solution of partially neutralized amine heated to about 85° C. The entire quantity of ethylene oxide is added over a period of five hours at a reaction temperature of about 80°–85° C. A terminal heating period of ten minutes at 99–100° C. is allowed. The weight of the resulting mixture is 247 g., indicating that fourteen equivalents of ethylene oxide has reacted. The solution is adjusted to a pH of 7 by the addition of sufficient 85% phosphoric acid to bring the total quantity of acid to approximately 100% of the theoretical quantity.

A solution of the above compound is applied to a fabric formed of A–MA fiber in the same manner described under Example 9. The treated fabric has excellent antistatic properties which it retains after at least 5 launderings. The pertinent data are given in Table III.

TABLE III

| Cloth of— | Antistatic rating of untreated cloth in inches | Treated cloth | | | | | |
|---|---|---|---|---|---|---|---|
| | | Before laundering | | After 1 laundering | | After 5 launderings | |
| | | Percent finish on cloth | Antistatic rating in inches | Percent finish on cloth | Antistatic rating in inches | Percent finish on cloth | Antistatic rating in inches |
| A–MA | 2½ | 3.8 | 0 | 2.5 | 0 | 2.4 | 0 |

Example 12

Example 11 is repeated with the exception that the polyethoxamer (13) of 2-hydroxyethyl hexadecenyl dimethyl ammonium dihydrogen phosphate is used instead of the quaternary ammonium compound employed in that example. Similar results are obtained.

The antistatic agent used in this example is prepared in essentially the same manner employed in preparing the compound used in Example 11 with the exception that oleyl dimethyl amine is used in place of cetyl dimethyl amine; also, additional phosphoric acid is not added at the end of the condensation, and the pH is permitted to remain at about 9.

Example 13

This example illustrates the use, as an antistatic agent on a cloth formed of A–MA fibre, of octadecyl dimethyl decaisopropeneoxy ammonium chloride, which compound also may be named as the poly(methylethoxamer) [13] of 2-hydroxypropyl octadecyl dimethyl ammonium chloride. One method of preparing this compound is described below:

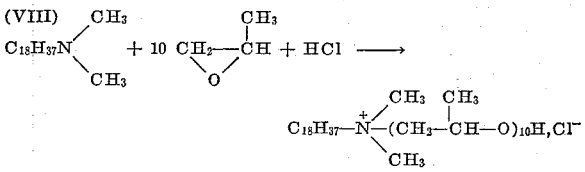

| | Grams | Moles |
|---|---|---|
| Octadecyl dimethyl amine | 74.3 | 0.25 |
| Propylene oxide | 163.0 | 2.80 |
| Hydrochloric acid (60% of theory) | 15.0 g. of 12 N acid | 0.15 |

The octadecyl dimethyl amine is dissolved in 100 g. of sec.-butanol, the 15 g. of 12 N hydrochloric acid added, and the solution is then heated to about 82° C. The entire quantity of propylene oxide is added slowly, from a dropping funnel, over a period of approximately three hours. The temperature is held between about 73° C. and about 88° C. by means of external heating during this time. A terminal heating period of 15 minutes is allowed, at the end of which time the temperature has risen to 94° C. and the solution has ceased refluxing. The reaction is, therefore, assumed to be complete. The final reaction mixture weighs 334 g., indicating that 10 equivalents of propylene oxide has reacted. The solution is adjusted to a pH of 4 by the addition of sufficient hydrochloric acid to bring the total amount of acid added to over 100% of the theoretical amount.

A solution of the above compound is applied to a fabric formed of A–MA fiber in the same manner described under Example 9. The treated fabric has excellent antistatic properties through 2 launderings, but falls off noticeably after 5 launderings. The pertinent data are given in Table IV.

TABLE IV

| Cloth | Antistatic rating of untreated cloth in inches | Treated cloth | | | | | |
|---|---|---|---|---|---|---|---|
| | | Before laundering | | After 1 laundering | | After 5 launderings | |
| | | Percent finish on cloth | Antistatic rating in inches | Percent finish on cloth | Antistatic rating in inches | Percent finish on cloth | Antistatic rating in inches |
| A–MA | 2½ | 3.7 | 0 | 2.9 | 0 | 2.6 | ½ |

Example 14

This example illustrates the use, as an antistatic agent on a cloth formed of A–MA fiber, of a mixture of about 75% octadecyl tri-(tetratheneoxy) ammonium chloride and about 25% octadecyl di(tetratheneoxy) ammonium chloride. One method of preparing this mixture is described below:

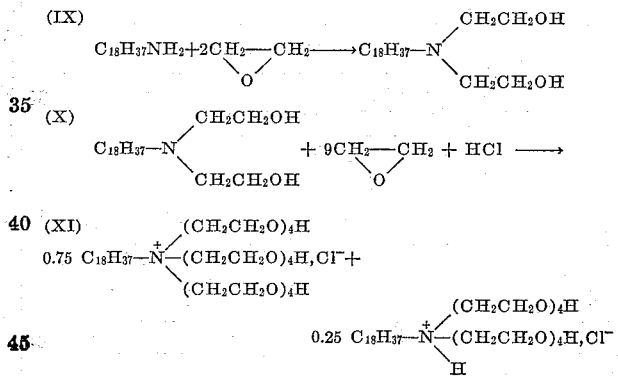

| | Grams | Moles |
|---|---|---|
| Octadecyl amine | 53.8 | 0.20 |
| Ethylene oxide | 115.0 | 2.60 |
| Hydrochloric acid (70% of theoretical quantity) | 14.0 g. of 12 N soln | 0.14 |

The octadecyl amine is dissolved in 54 g. of sec.-butanol and 18 g. (0.41) mole of ethylene oxide is added over a 1-hour period and at a reaction temperature of about 94° C. A terminal heating period of 15 minutes at 107° C. is allowed. All (70%) of the hydrochloric acid solution is added (pH is reduced to 8), and the remaining ethylene oxide is added over a 3-hour period at a reaction temperature of 85–110° C. A terminal reflux period of 20 minutes at 110° C. is allowed. The weight of the resulting solution (pH of 9) is 220 g., indicating that eleven equivalents of ethylene oxide has reacted.

A solution of the mixture of nitrogenous compounds produced as described above is applied to a fabric formed of A–MA fiber in the same manner described under Example 9. The application bath contains about 1.27% of the aforesaid mixture of nitrogenous compounds (solids basis), and the liquid-to-cloth ratio is 40:1. The treated fabric has excellent antistatic properties through more than 5 launderings. The pertinent data are given in Table V.

TABLE V

| Cloth of— | Antistatic rating of untreated cloth in inches | Treated cloth | | | | | |
|---|---|---|---|---|---|---|---|
| | | Before laundering | | After 1 laundering | | After 5 launderings | |
| | | Percent finish on cloth | Antistatic rating in inches | Percent finish on cloth | Antistatic rating in inches | Percent finish on cloth | Antistatic rating in inches |
| A-MA | 2½ | 5.0 | 0 | 3.9 | 0 | 3.5 | 0 | perature at 93–96° C.) for 1½ hours to insure completeness of the reaction. The weight of the final product of 66% solids is 111 g., indicating that 9.4 equivalents of ethylene oxide has reacted. The solution is adjusted to a final pH of 4 by the addition of 6 N hydrochloric acid.

A solution of the above compound is applied to fabric formed of A–MA fiber in the same manner described under Example 9 and, also, using a 0.5% concentration of the compound in the application bath. In both instances the treated fabric has excellent antistatic properties through more than 15 launderings. The pertinent data are given in Table VI.

TABLE VI

| Cloth of— | Antistatic rating of untreated cloth in inches | Treated cloth | | | | | | | | | |
|---|---|---|---|---|---|---|---|---|---|---|---|
| | | Before laundering | | After 1 laundering | | After 5 launderings | | After 10 launderings | | After 15 launderings | |
| | | Percent finish on cloth | Antistatic rating in inches | Percent finish on cloth | Antistatic rating in inches | Percent finish on cloth | Antistatic rating in inches | Percent finish on cloth | Antistatic rating in inches | Percent finish on cloth | Antistatic rating in inches |
| A-MA | 2½ | [1] 4.0 | 0 | 3.6 | 0 | 3.5 | 0 | 3.3 | 0 | 3.2 | 0 |
| A-MA | 2½ | [2] 4.2 | 0 | 3.5 | 0 | 3.3 | 0 | 3.2 | 0 | 3.2 | 0 |

[1] The application bath contained 0.5% by weight of the quaternary ammonium compound.
[2] The application bath contained 1% by weight of the quaternary ammonium compound.

*Example 15*

This example illustrates the use, as an antistatic agent on a cloth formed of A–MA fiber, of the polyethoxamer (9.4) of 2-hydroxyethyl octadecyl dimethyl ammonium chloride. One method of preparing this compound is described below:

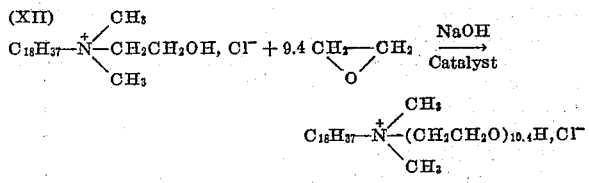

(XII)

|  | Grams | Moles |
|---|---|---|
| Octadecyl dimethyl 2-hydroxyethyl ammonium chloride (as a solution containing 50% active solids, 26% isopropanol and 24% water). | 64 g. of soln. | 0.0848 |
| Ethylene oxide | 57 | 1.3 |
| Sodium hydroxide |  | Catalytic amount. |

The aqueous isopropanolic solution of octadecyl dimethyl 2-hydroxyethyl ammonium chloride is placed in a 500 ml., 3-necked reaction vessel fitted with a mechanical stirrer, a Dry-Ice reflux condenser, a thermometer, and a gas-inlet tube extending below the surface of the liquid. A few drops of a 40% aqueous solution of sodium hydroxide are added to yield a solution having a pH of 8. An additional 0.88 ml. (15 mole percent based on quaternary salt) of the 40% aqueous sodium hydroxide solution is added as a catalyst. The mixture is heated to 77° C. on a steam bath, and then ethylene oxide is introduced through the gas-inlet tube at such a rate that a moderate reflux is obtained. The addition of the 57 g. of ethylene oxide is made over an 8-hour period. The temperature is maintained between 77° and 93° C. during the addition, by means of heating on a steam bath. Frequent small additions of sodium hydroxide are found necessary for the maintenance of pH ≃9, and consequently the maintenance of a reasonable reaction rate. After the addition of the ethylene oxide has been concluded, the mixture is refluxed (tem-

*Example 16*

Example 11 is repeated but substituting for cloth formed of A–MA fiber, employed in that example, the following:

Silk cloth
Woolen flannel
Rayon suiting
Rayon challis
Acetate rayon fabric

The treated fabrics fail to accumulate static charges of electricity when stroked with metal, glass or plastic combs whereas the untreated fabrics rapidly pick up and retain electrostatic charges when subjected to these same tests.

It will be understood, of course, by those skilled in the art that the present invention is not limited to the particular compositions containing the particular ingredients and proportions thereof that are given in the above illustrative examples. Examples of other molding compositions which can be modified by incorporating therein an antistatic agent comprising a nitrogenous compound of the kind embraced by Formula I are those disclosed and claimed in, for instance, U.S. Patents 2,572,798, 2,616,862 and 2,636,869, as well as others directed to the production of sound records. Nitrogenous compounds other than those given in the foregoing examples and which are embraced by Formula I also can be used in lieu of or conjointly with the specific nitrogenous compound named in the particular example.

I claim:

1. A water-insoluble, organic article which in a dry state normally has a tendency to accumulate static charges of electricity thereon, said article having deposited at least on outer surfaces thereof an antistatic composition comprising a quaternary ammonium compound represented by the general formula

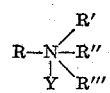

wherein R represents a member of the group consisting of aliphatic hydrocarbon and alicyclic hydrocarbon radicals containing at least 7 carbon atoms, R′ designates a radical represented by the formula $-(C_nH_{2n}O)_mH$ where $n$ represents a positive integer from 2 to 4, inclusive, and $m$ is a positive integer and is at least 3, R" represents a member of the group consisting of alkyl and hydroxyalkyl radicals containing from 1 to 5 carbon atoms, inclusive, and a radical represented by the formula —$(C_nH_{2n}O)_mH$ where $n$ represents a positive integer from 2 to 4, inclusive, and $m$ is a positive integer and is at least 3, R''' represents a member of the group consisting of hydrogen, alkyl and hydroxyalkyl radicals containing from 1 to 5 carbon atoms, inclusive, and a radical represented by the formula —$(C_nH_{2n}O)_mH$ where $n$ represents a positive integer from 2 to 4, inclusive, and $m$ is a positive integer and is at least 3, and Y represents an anion, the amount of the said quaternary ammonium compound which is associated with the said article corresponding to from 0.2% to 15% of the weight of the dry, untreated article, and said quaternary ammonium compound lessening the tendency of the said article to accumulate static charges of electricity thereon.

2. A water-insoluble, organic article as in claim 1 wherein Y in the general formula for the quaternary ammonium compound represents a chloride.

3. A water-insoluble, organic article as in claim 1 wherein Y in the general formula for the quaternary ammonium compound represents a phosphate.

4. A water-insoluble, organic article as in claim 1 wherein $m$ in the formula for the radical represented by R' in the general formula for the quaternary ammonium compound represents a positive integer from 4 to 50, inclusive.

5. A water-insoluble, organic article as in claim 1 wherein the quaternary ammonium compound is octadecyl dimethyl octaetheneoxy ammonium chloride.

6. A water-insoluble, organic article as in claim 1 wherein the quaternary ammonium compound is octadecyl dimethyl decaetheneoxy ammonium chloride.

7. A water-insoluble, organic article as in claim 1 wherein the quaternary ammonium compound is a mixture of octadecyl di-(tetraetheneoxy) ammonium chloride and octadecyl tri-(tetraetheneoxy) ammonium chloride.

8. A water-insoluble, organic article as in claim 1 wherein the quaternary ammonium compound is octadecyl dimethyl dotriacontaetheneoxy ammonium phosphate.

9. A shaped, water-insoluble, organic article comprising a water-insoluble vinyl resin which in a dry state normally has a tendency to accumulate static charges of electricity thereon, said article having deposited at least on outer surfaces thereof an antistatic composition comprising a quaternary ammonium compound represented by the general formula

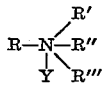

wherein R represents a member of the group consisting of aliphatic hydrocarbon and alicyclic hydrocarbon radicals containing at least 7 carbon atoms, R' designates a radical represented by the formula —$(C_nH_{2n}O)_mH$ where $n$ represents a positive integer from 2 to 4, inclusive, and $m$ is a positive integer and is at least 3, R" represents a member of the group consisting of alkyl and hydroxyalkyl radicals containing from 1 to 5 carbon atoms, inclusive, and a radical represented by the formula —$(C_nH_{2n}O)_mH$ where n represents a positive integer from 2 to 4, inclusive, and $m$ is a positive integer and is at least 3, R''' represents a member of the group consisting of hydrogen, alkyl and hydroxyalkyl radicals containing from 1 to 5 carbon atoms, inclusive, and a radical represented by the formula —$(C_nH_{2n}O)_mH$ where $n$ represents a positive integer and is at least 3, and Y represents an anion, the amount of the said quaternary ammonium compound which is associated with the said article corresponding to from 0.2% to 15% of the weight of the dry, untreated article, and said quaternary ammonium compound lessening the tendency of the said article to accumulate static charges of electricity thereon.

10. A textile formed of fibers including water-insoluble, organic fibers of a thermoplastic product of polymerization of polymerizable vinyl compound including acrylonitrile, said textile in a dry state normally having a tendency to accumulate static charges of electricity thereon and, to lessen this tendency, having deposited at least on outer surfaces thereof an antistatic composition comprising a quaternary ammonium compound represented by the general formula

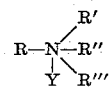

wherein R represents a member of the group consisting of aliphatic hydrocarbon and alicyclic hydrocarbon radicals containing at least 7 carbon atoms, R' designates a radical represented by the formula —$(C_nH_{2n}O)_mH$ where $n$ represents a positive integer from 2 to 4, inclusive, and $m$ is a positive integer and is at least 3', R" represents a member of the group consisting of alkyl and hydroxyalkyl radicals containing from 1 to 5 carbon atoms, inclusive, and a radical represented by the formula —$(C_nH_{2n}O)_mH$ where $n$ represents a positive integer from 2 to 4, inclusive, and $m$ is a positive integer and is at least 3, R''' represents a member of the group consisting of hydrogen, alkyl and hydroxyalkyl radicals containing from 1 to 5 carbon atoms, inclusive, and a radical represented by the formula —$(C_nH_{2n}O)_mH$ where $n$ represents a positive integer from 2 to 4, inclusive, and $m$ is a positive integer and is at least 3, and Y represents an anion, the amount of the said quaternary ammonium compound which is associated with the said textile corresponding to from 0.2% to 15% of the weight of the dry, untreated textile, and said quaternary ammonium compound lessening the tendency of the said textile to accumulate static charges of electricity thereon.

11. A molding composition comprising (1) a water-insoluble, organic plastic material which normally tends to accumulate static charges of electricity after the article has been molded and (2) an antistatic agent therefor comprising a quaternary ammonium compound represented by the general formula

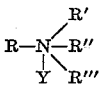

wherein R represents a member of the group consisting of aliphatic hydrocarbon and alicyclic hydrocarbon radicals containing at least 7 carbon atoms, R' designates a radical represented by the formula —$(C_nH_{2n}O)_mH$ where $n$ represents a positive integer from 2 to 4, inclusive, and $m$ is a positive integer and is at least 3, R" represents a member of the group consisting of alkyl and hydroxyalkyl radicals containing from 1 to 5 carbon atoms, inclusive, and a radical represented by the formula —$(C_nH_{2n}O)_mH$ where $n$ represents a positive integer from 2 to 4, inclusive, and $m$ is a positive integer and is at least 3, R''' represents a member of the group consisting of hydrogen, alkyl and hydroxyalkyl radicals containing from 1 to 5 carbon atoms, inclusive, and a radical represented by the formula —$(C_nH_{2n}O)_mH$ where $n$ represents a positive integer from 2 to 4, inclusive, and $m$ is a positive integer and is at least 3, and Y represents an anion, the amount of the said quaternary ammonium compound which is incorporated in the said molding composition constituting, by weight, from 1% to 15% of the weight of the said plastic material.

12. A product comprising the molded composition of claim 11.

13. The method of conditioning a water-insoluble, organic material which, in a dry state, normally tends to accumulate static charges of electricity thereon, said method comprising applying to the said material a volatile liquid compound containing (a) at least one member of the group consisting of water and isopropanol and (b) a quaternary ammonium compound represented by the general formula

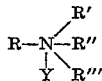

wherein R represents a member of the group consisting of aliphatic hydrocarbon and alicyclic hydrocarbon radicals containing at least 7 carbon atoms, R' designates a radical represented by the formula $-(C_nH_{2n}O)_mH$ where $n$ represents a positive integer from 2 to 4, inclusive, and $m$ is a positive integer and is at least 3, R" represents a member of the group consisting of alkyl and hydroxyalkyl radicals containing from 1 to 5 carbon atoms, inclusive, and a radical represented by the formula $$-(C_nH_{2n}O)_mH$$

where $n$ represents a positive integer from 2 to 4, inclusive, and $m$ is a positive integer and is at least 3, R''' represents a member of the group consisting of hydrogen, alkyl and hydroxyalkyl radicals containing from 1 to 5 carbon atoms, inclusive, and a radical represented by the formula $$-(C_nH_{2n}O)_mH$$

where $n$ represents a positive integer from 2 to 4, inclusive, and $m$ is a positive integer and is at least 3, and Y represents an anion, and the amount of the said liquid containing the said quaternary ammonium compound which is applied to the said material being such that the finished material has associated therewith from, by weight, 0.2% to 15% of the said quaternary ammonium compound, based on the weight of the dry, untreated material, and drying the thus treated material.

14. A method as in claim 13 wherein the water-insoluble, organic material which is conditioned is a shaped, water-insoluble, organic article comprising a water-insoluble vinyl resin which in a dry state normally tends to accumulate static charges of electricity.

15. A method as in claim 13 wherein the water-insoluble, organic material which is conditioned is a textile formed of water-insoluble, organic fibers including fibers of a thermoplastic product of polymerization of polymerizable vinyl compound including acrylonitrile, said textile in a dry state normally having a tendency to accumulate static charges of electricity thereon.

16. The method which comprises incorporating an antistatic agent into a molding composition containing a water-insoluble, organic plastic material which normally tends to accumulate static charges of electricity after the article has been molded, said antistatic agent comprising a quaternary ammonium compound represented by the general formula

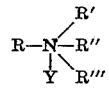

wherein R represents a member of the group consisting of aliphatic hydrocarbon and alicyclic hydrocarbon radicals containing at least 7 carbon atoms, R' designates a radical represented by the formula $-(C_nH_{2n}O)_mH$ where $n$ represents a positive integer from 2 to 4, inclusive, and $m$ is a positive integer and is at least 3, R" represents a member of the group consisting of alkyl and hydroxyalkyl radicals containing from 1 to 5 carbon atoms, inclusive, and a radical represented by the formula $-(C_nH_{2n}O)_mH$ where $n$ represents a positive integer from 2 to 4, inclusive, and $m$ is a positive integer and is at least 3, R''' represents a member of the group consisting of hydrogen, alkyl and hydroxyalkyl radicals containing from 1 to 5 carbon atoms, inclusive, and a radical represented by the formula $-(C_nH_{2n}O)_mH$ where $n$ represents a positive integer from 2 to 4, inclusive, and $m$ is a positive integer and is at least 3, and Y represents an anion, the amount of the said quaternary ammonium compound which is incorporated in the said molding composition being, by weight, from 1% to 15% of the weight of the said plastic material, and molding the resulting molding composition.

References Cited in the file of this patent

UNITED STATES PATENTS

| | | |
|---|---|---|
| 2,173,069 | Ulrich | Sept. 12, 1939 |
| 2,589,674 | Cook et al. | Mar. 18, 1952 |
| 2,626,876 | Carnes | Jan. 27, 1953 |

UNITED STATES PATENT OFFICE
CERTIFICATE OF CORRECTION

Patent No. 2,897,170

July 28, 1959

Arnold H. Gruber

It is hereby certified that error appears in the printed specification of the above numbered patent requiring correction and that the said Letters Patent should read as corrected below.

Column 2, line 21, for "article in" read -- article is --; column 3, line 42, for "charactereistics" read -- characteristics --; column 5, line 36, for "actate" read -- acetate --; line 53, for "of unsaturated" read -- of an unsaturated --; column 7, line 60, after "hereinbefore" insert a comma; column 11, line 12, Example 5, for "ammonuim" read -- ammonium --; column 13, line 51, for "dotriacontaetheaneoxy" read --dotriacontaetheneoxy--; column 14, line 10, for "frabrics" read -- fabrics --; column 15, line 41, for "fibre" read -- fiber --.

Signed and sealed this 12th day of April 1960.

(SEAL)
Attest:

KARL H. AXLINE
Attesting Officer

ROBERT C. WATSON
Commissioner of Patents